(12) United States Patent
Mendoza et al.

(10) Patent No.: US 11,988,191 B2
(45) Date of Patent: May 21, 2024

(54) INFLATABLE WIND TURBINE BLADE AND ATTACHMENT MECHANISM

(71) Applicant: Alliance for Sustainable Energy, LLC, Golden, CO (US)

(72) Inventors: Nicole Renee Mendoza, Longmont, CO (US); Nicholas Aaron Johnson, Golden, CO (US); Derek Stephen Berry, Broomfield, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/066,371

(22) Filed: Dec. 15, 2022

(65) Prior Publication Data
US 2023/0184209 A1    Jun. 15, 2023

Related U.S. Application Data

(60) Provisional application No. 63/289,748, filed on Dec. 15, 2021.

(51) Int. Cl.
| | | |
|---|---|---|
| *F03D 1/06* | (2006.01) | |
| *B29C 70/48* | (2006.01) | |
| *B29D 99/00* | (2010.01) | |
| *B29L 31/08* | (2006.01) | |

(52) U.S. Cl.
CPC ............ *F03D 1/0675* (2013.01); *B29C 70/48* (2013.01); *B29D 99/0025* (2013.01); *B29L 2031/085* (2013.01); *F05B 2230/20* (2013.01); *F05B 2230/90* (2013.01); *F05B 2280/6001* (2013.01); *Y02P 70/50* (2015.11)

(58) Field of Classification Search
CPC ........ F03D 1/0675; F03D 1/065; F03D 80/00; B29D 99/0025; B29D 99/0028; B29L 2031/085

See application file for complete search history.

(56) References Cited

U.S. PATENT DOCUMENTS

| | | |
|---|---|---|
| 6,264,877 B1 | 7/2001 | Pallu De La Barriere |
| 7,938,623 B2 | 5/2011 | Cairo et al. |

(Continued)

FOREIGN PATENT DOCUMENTS

| | | | | |
|---|---|---|---|---|
| CN | 102322408 A | * | 1/2012 | ............... F03D 1/00 |
| CN | 111692041 A | * | 9/2020 | ......... B29D 99/0028 |

(Continued)

OTHER PUBLICATIONS

English translation of CN111927701A (Year: 2020).*

(Continued)

*Primary Examiner* — J. Todd Newton
*Assistant Examiner* — Wesley Le Fisher
(74) *Attorney, Agent, or Firm* — Alexandra M. Hall

(57) ABSTRACT

Among other things, the present disclosure relates to a wind turbine rotor blade that can be assembled at the site of its wind turbine. The blade includes an internal structure which may be pre-fabricated with connections to the shell skin prior to being transported to the site of its wind turbine. A filler material may be injected into the layers of fabric making up the shell skin at the wind turbine site and allowed to harden at approximately atmospheric conditions.

13 Claims, 6 Drawing Sheets

(56) References Cited

U.S. PATENT DOCUMENTS

| | | | | |
|---|---|---|---|---|
| 7,963,747 | B2* | 6/2011 | Cairo | F03D 1/0675 |
| | | | | 416/241 A |
| 8,753,091 | B1* | 6/2014 | Braley | F03D 13/10 |
| | | | | 416/226 |
| 9,651,024 | B2* | 5/2017 | Soloway | F03D 1/0675 |
| 9,903,338 | B2* | 2/2018 | Lin | F03D 7/0236 |
| 9,919,448 | B2* | 3/2018 | van Kleef | B27M 1/08 |
| 11,519,382 | B2* | 12/2022 | Badger | B32B 27/18 |
| 2011/0052408 | A1 | 3/2011 | Zuteck et al. | |
| 2013/0199043 | A1 | 8/2013 | Stiesdal et al. | |
| 2014/0119937 | A1 | 5/2014 | Fang et al. | |
| 2015/0167472 | A1* | 6/2015 | Lin | F03D 7/0236 |
| | | | | 29/889.7 |
| 2015/0252780 | A1* | 9/2015 | Jonnalagadda | F03D 1/0675 |
| | | | | 416/226 |
| 2015/0266249 | A1* | 9/2015 | Booth | B29C 51/105 |
| | | | | 264/263 |
| 2018/0298878 | A1 | 10/2018 | Malpede et al. | |
| 2022/0213867 | A1* | 7/2022 | Sutton | B29C 66/12463 |

FOREIGN PATENT DOCUMENTS

| | | | | |
|---|---|---|---|---|
| CN | 111927701 A | * | 11/2020 | B29C 65/18 |
| DE | 102007036536 A1 | * | 2/2009 | F03D 1/0675 |
| WO | 2013/040878 A1 | | 3/2013 | |
| WO | 2013/040879 A1 | | 3/2013 | |
| WO | WO-2013036158 A1 | * | 3/2013 | B29C 33/0016 |
| WO | WO-2020216422 A1 | * | 10/2020 | B29C 65/18 |

OTHER PUBLICATIONS

English translation of DE102007036536A1 (Year: 2009).*
English translation of CN102322408A (Year: 2012).*
English translation of CN111692041A (Year: 2020).*
"Polytetrafluoroethylene", Apr. 23, 2021, Wikipedia (Year: 2021).*
Price et al., "Applications for Braided Textile Inflatable Structural Members", SAMPE 2013 Conference, Jun. 2013, available at https://www.nasampe.org/store/viewproduct.aspx?id=4410429, pp. 1-15.
Smith et al., "Supersized Wind Turbine Blade Study: R&D Pathways for Supersized Wind Turbine Blades", Lawrence Berkley National Laboratory, DNV-GL—Document No. 10080081-HOU-R-01, Issue D, Mar. 2019, available at https://escholarship.org/uc/item/0vr6b23m, pp. 1-101.
Wetzel et al., "Design and Manufacturing of Modular Wind Turbine Blades", Wetzel Engineering Inc., 2015, available at http://5980c1917cb02508ad8a-145c0cd6e0bc8080df9d3865f16d59d7.r67.cf1.rackcdn.com/windpower/pdf/166297.pdf, pp. 1-36.
Young et al., "Structural Analysis of Hypersonic Inflatable Aerodynamic Decelerator Pressure Tub Testing", Journal of Thin-Walled Structures, vol. 131, Oct. 2018, available at https://doi.org/10.1016/j.tws.2018.07.035, pp. 869-882.
"ARPA-E Tensioned Fabric Wind Blades", GE Publication, ARPA-E Cooperative Agreement DE-AR0000293, Nov. 2014, available at https://home.engineering.iastate.edu/~jdm/wesep594/TFB_public_Nov2014_v4.pdf, accessed on Feb. 2, 2023, pp. 1-13.
Ennis et al., "Optimized Carbon Fiber Composites in Wind Turbine Blade Design", Sandia National Laboratories Report, SAND2019-14173, Nov. 2019, pp. 1-70.
Johnson et al., "Big Adaptive Rotor Phase I Final Report", NREL Technical Report NREL/TP-5000-79855, Dec. 2021, pp. 1-93.
Johnson et al., "Investigation of Innovative Rotor Concepts for the Big Adaptive Rotor Project", NREL Technical Report NREL/TP-5000-73605, Sep. 2019, pp. 1-73.
Lichodziejewski et al., "Ground and Flight Testing of a Stacked Tori Hypersonic Inflatable Aerodynamic Decelerator Configuration", AIAA 2013-1864, 54th AIAA/ASME/ASCE/AHS/ASC Structures, Structural Dynamics, and Materials Conference, Apr. 2013, available at https://arc.aiaa.org/doi/abs/10.2514/6.2013-1864, pp. 1-10.
Mendoza et al., "Conceptual Designs of the Structure of Inflatable Blades for Enabling Larger Turbines", AIAA SciTech Forum, Jan. 2021, available at https://arc.aiaa.org/doi/abs/10.2514/6.2021-0815, pp. 1-13.

* cited by examiner

INFLATABLE WIND TURBINE BLADE AND ATTACHMENT MECHANISM

CROSS-REFERENCE TO RELATED APPLICATIONS

This application claims priority to U.S. Provisional Application No. 63/289,748 filed on Dec. 15, 2022, the contents of which are incorporated herein by reference in their entirety.

CONTRACTUAL ORIGIN

This invention was made with United States government support under Contract No. DE-AC36-08G028308 awarded by the U.S. Department of Energy. The United States government has certain rights in this invention.

SUMMARY

An aspect of the present disclosure is a method of making a blade for a wind turbine rotor, the method including manufacturing a pre-fabricated structure including a primary structure, an inner fabric layer, and an outer fabric layer, transporting the pre-fabricated structure to a wind turbine site, and injecting a filler material between the inner fabric layer and the outer fabric layer. In some embodiments, the inner fabric layer includes a first edge and a first length, the outer fabric layer includes a second edge and a second length, the manufacturing includes applying a resin to the primary structure, the first edge, and the second edge, and the manufacturing includes protecting the first length and the second length from the resin. In some embodiments, the manufacturing includes using a vacuum assisted resin transfer molding (VARTM) or resin transfer molding (RTM) process. In some embodiments, the protecting includes using a vacuum-sealed bag positioned to cover the first length. In some embodiments, the protecting includes using a vacuum-sealed bag positioned to cover and the second length. In some embodiments, the resin includes at least one of a polyester resin, an epoxy resin, or a polyester gelcoat. In some embodiments, the method also includes allowing the filler material to solidify, and during the injecting and the allowing a mold is used to support the inner fabric layer and the outer fabric layer, and the mold is removed from the blade when the allowing is completed. In some embodiments, the mold includes an inflatable mandrel. In some embodiments, the method also includes connecting the first length to a third length in which the inner fabric layer is a first inner fabric layer, and a second inner fabric layer includes the third length. In some embodiments, the connecting includes sewing, gluing, or taping. In some embodiments, the method also includes connecting the second length to a fourth length, in which the outer fabric layer is a first outer fabric layer, and an outer inner fabric layer comprises the fourth length. In some embodiments, the connecting includes sewing, gluing, or taping. In some embodiments, the filler material includes polyurethane foam. In some embodiments, the outer fabric layer has a coating, and the coating includes Teflon.

An aspect of the present disclosure is a blade for a wind turbine rotor, the blade including a pre-fabricated structure comprising a primary structure, an inner fabric layer, and an outer fabric layer, and a filler material positioned between the inner fabric layer and the outer fabric layer; in which the inner fabric layer includes a first edge and a first length, the outer fabric layer includes a second edge and a second length, and a resin is applied to the primary structure, the first edge, and the second edge. In some embodiments, the inner fabric layer is a first inner fabric layer, the first length is connected to a third length, and a second inner fabric layer includes the third length. In some embodiments, the outer fabric layer is a first outer fabric layer, the second length is connected to a fourth length, and a second outer fabric layer includes the fourth length. In some embodiments, the filler material includes polyurethane foam. In some embodiments, the primary structure comprises a composite, a carbon fiber, a glass fiber, a plastic, or a balsa wood. In some embodiments, the outer fabric layer has a coating, and the coating includes Teflon.

BACKGROUND

Wind turbines are used to generate electricity from wind. They are mounted on towers, often 100 feet or more above the ground, to access increased wind speeds at higher elevations above the ground. Wind turbines "catch" the wind's energy with their propeller-like blades. Typically, a wind turbine will have two or three blades which are mounted on a shaft to form a rotor. Reducing the cost of wind turbines and rotors results in a decrease in the cost of wind energy.

Larger blades make for a larger area created by the blades rotating (known as the "swept area") and thus enable the wind turbine to generate more electricity. A current limit to the size of the swept area is the size limits for transporting wind turbine blades from the factory to the location of the wind turbine. Currently, blades larger than about 75 m in length, having about a 4.75 m chord, and a 4.5 m root diameter are not able to be transported using traditional methods (trucks, trains, etc.). This limits the ability of larger rotors and blades to be used. Thus, there remains a need for larger blades that can be easily transported.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMBERS

Figure 1:
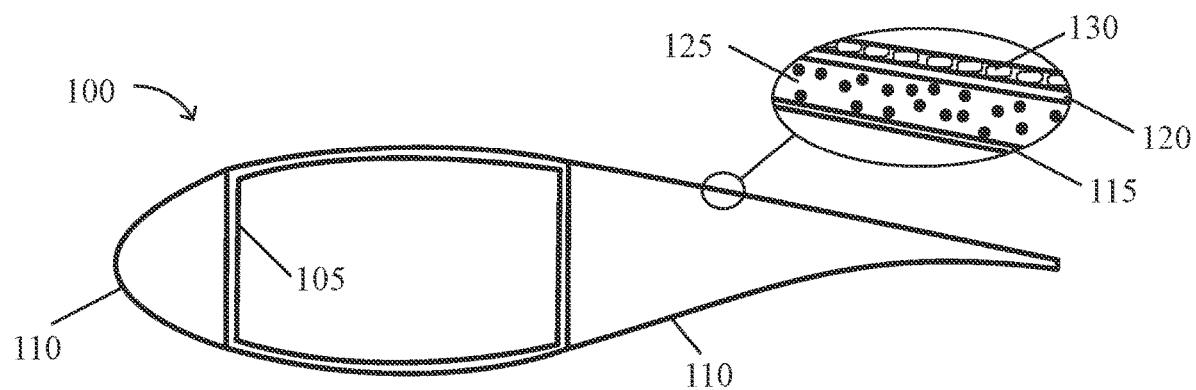
FIG. 1 illustrates a cross section of an inflatable wind turbine rotor blade, according to some aspects of the present disclosure.

100 . . . blade
105 . . . primary structure
110 . . . shell skin
115 . . . inner fabric layer
120 . . . outer fabric layer
125 . . . filler material
130 . . . coating
200 . . . method
205 . . . manufacturing
210 . . . transporting
225 . . . connecting
300 . . . support beam
305 . . . pre-made component
310 . . . void
400 . . . pre-fabricated structure
405 . . . bag
410 . . . VARTM/RTM mold
415 . . . shear web
420 . . . spar cap
425 . . . adhesive
500 . . . edge
505 . . . length

DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to a wind turbine rotor blade that can be assembled at the site of its wind turbine. The blade includes an internal structure which may be pre-fabricated prior to being transported then injected with a filler material to generate its final shape at the site of its wind turbine. This may allow for the blade to be lighter and cheaper to both transport and manufacture. A filler material may be injected into the layers of fabric making up the shell skin at the wind turbine site and allowed to harden at approximately atmospheric conditions. In this present disclosure, "blade", "wind turbine blade," "rotor blade," and "wind turbine rotor blade" may be used interchangeably.

In some embodiments, the wind turbine rotor blade may be an inflatable wind turbine blade, meaning the blade is substantially hollow with a fabric "shell" or skin. As used herein, "shell," "skin," and "shell skin" may be used interchangeably. In some embodiments, the shell skin may include a "sandwich" of at least two layers of fabric (for example, at least an inner fabric layer and an outer fabric layer) capsulating a filler material (i.e., an injectable material, such as foam, capable of expanding after being injected) which can harder under atmospheric conditions in a reasonable period of time (for example, several hours) without needing heating equipment. The filler material, when hardened, may provide the necessary rigidity to maintain the blade's aerodynamic shape.

Inflatable blades can reduce transportation constraints and costs by allowing the chord length of the blade to be less than traditional blades and the blade generally having a reduced weight. As described herein, the blade may be transported as decoupled components then the blade may be assembled by connecting pieces of the shell skin and injecting them with a filler material at or near the site of the final wind turbine.

In some embodiments of the present disclosure, the blade design transfers the loads from the shell skin to the primary structure. This may be done by including at least one edge of a layer of fabric of the shell skin in the manufacturing of the primary structure to form a pre-fabricated structure which can be transported to the site of the ultimate wind turbine prior to the blade being fully assembled. The pre-fabricated structure may be manufactured traditional methods. The primary structure and edges of the layers of fabric may be manufactured in a factory, the edges may be joined to the primary structure at various locations (for example, to the spar cap) during the infusion and curing process of the manufacturing process. At least a portion of the edges may be protected from the infusion and curing (i.e., protected from the application of resin). The deflated shell skin and primary structure may be transported to the site of the wind turbine or wind farm (for example, using a train).

In some embodiments, at or near the desired location of the final wind turbine, the blade shell skin may be connected (it may be in multiple swatches of fabric) which had been protected from resin using military-grade stitching. The shell skin may be shaped and hardened into its final rigid state by injecting a filler material between the layers of fabric. A mold or other support structure may be used on-site to support the shell skin while the filler hardens or sets. In some embodiments, the molds may be inflatable mandrels. The molds may be used to control the internal and external shapes of the blade. An inflatable mandrel may have stiffeners but lack rigid foam or wood components. The molds may be smaller and/or lighter than traditional molds because they do not need to capable of sealing or withstanding high curing temperatures. For efficiency, a single mold may be used for a plurality of blades that are desired to have a substantially similar shape and size. The molds may be made using additive manufacturing or three-dimensional (3D) printing. Once the filler material hardens, the molds may be removed and used for another blade.

FIG. 1 illustrates a cross section of an inflatable wind turbine rotor blade 100, according to some aspects of the present disclosure. The inflatable wind turbine blade 100 may include a primary structure 105, which may be an internal support structure for the blade 100. A shell skin 110 provides the overall shape of the blade 100 and is made up of an internal fabric layer 115, an outer fabric layer 120, a filler material 125 positioned between the internal fabric layer 115 and the outer fabric layer 120, and a coating 130 on the external facing surface of the shell skin 110.

The inflatable shell skin 110 may be made of the inner fabric layer 115, the outer fabric layer 120, and the filler material 125. As used herein, "shell skin" 110 refers to the exterior support/surface of the blade 100 and all the components which make up that exterior surface.

In some embodiments, the primary structure 105 may be made of a lightweight but solid material such as balsa wood, carbon fiber, glass, fiber glass(such as unidirectional (UD) reinforcement composite, Biax, and/or Triax), plastic, and/or a composite thereof. Other materials may also be used. The primary structure 105 may have a cross sectional shape (as shown in FIG. 1) that is substantially elliptical, substantially rectangular, and/or in a box beam shape. The primary structure 105 may be formed using additive manufacturing, three-dimensional (3D) printing, parts assembly, and/or other methods.

In some embodiments, the inner fabric layer 115 and/or the outer fabric layer may be a substantially durable fabric, capable of withstanding moisture. Examples of such fabrics may include carbon fiber, Kevlar®, fiberglass (such as UD reinforcement composite, Biax, and/or Triax), nylon (including nylon embedded with carbon fibers), glass-reinforced dry fabrics, vinyl. and/or a composite thereof. Other fabrics may also be used. The inner fabric layer 115 and the outer fabric layer 120 may have a plurality of hems, stitches, seams, and fabric sections and may be divided into a plurality of compartments, sections, and/or segments in chordwise and/or spanwise directions (see FIG. 3). In some embodiments, the inflatable wind turbine blade 100 may allow an aft web/side beam via the addition of fabric sections, compartments, stitches, seams, and/or hems (see FIG. 4).

Figure 4:
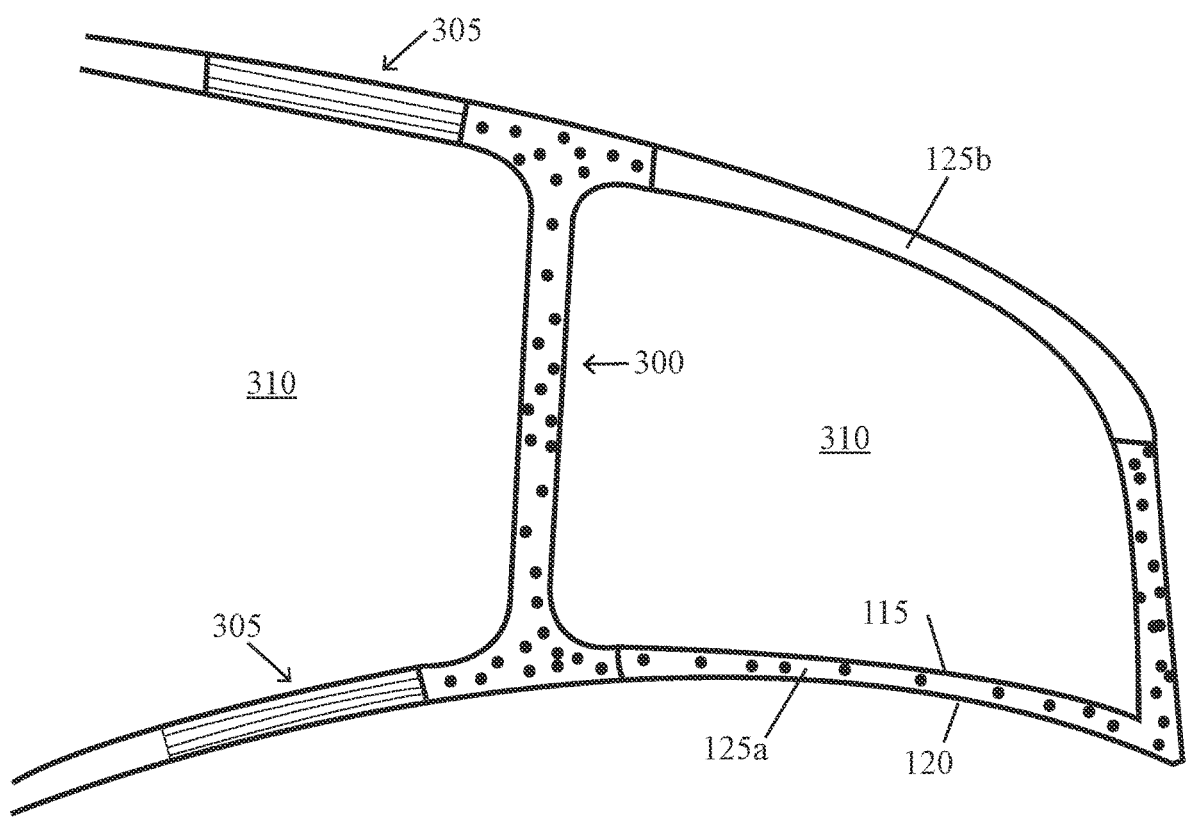
FIG. 4 illustrates an aft web/side beam connection enabled by the compartmentalization of the shell skin of an inflatable wind turbine blade, according to some aspects of the present disclosure.

FIG. 4 illustrates an aft web/side beam connection enabled by the compartmentalization of the shell skin 110 of an inflatable wind turbine blade 100, according to some aspects of the present disclosure. As shown in FIG. 4, different filler materials 125 may be used in different portions of the blade 100. That is, a foam filler material 125a may be used in portions of the blade 100 while a gas filler material 125b may be used in other portions of the blade 100. The inner fabric layer 115 and the outer fabric layer 120 may create a "sandwich" on either side of the filler material 125. A mold (not shown) may be used to hold the inner fabric layer 115 and the outer fabric layer 120 in position until the filler material 125 has set or is in the proper position.

FIG. 4 shows how the methods described herein may create at least one void 310 within the interior of the blade 100. This may lead to a significantly reduced weight of the blade 100.

In some embodiments, the filler material 125 may be a material which is in a substantially liquid form but is capable of solidifying after being injected between the inner fabric layer 115 and the outer fabric layer 120 at substantially atmospheric conditions (i.e., the temperature and humidity of the site of the assembly of the blade 100). Examples of the filler material 125 may include foam, composites, plastics, wood, and/or inert gases (e.g., air). The filler material 125 may be polyurethane foam, diphenylmethane diisocyante, isocyanic acid, polymethylenepolyphenylene ester, polymethylenepolyphenyl polyisocyante, and/or a mixture thereof. The filler material 125 may be capable of maintaining a substantially rigid (i.e., solid) state after being allowed to harden into its final shape. The filler material 125 may ensure the blade 100 maintains its desired shape after being assembled/manufactured. In other embodiments, the filler material 125 may not become substantially solid, in those embodiments, the filler material 125 may be a gas, such as air.

Figure 2:
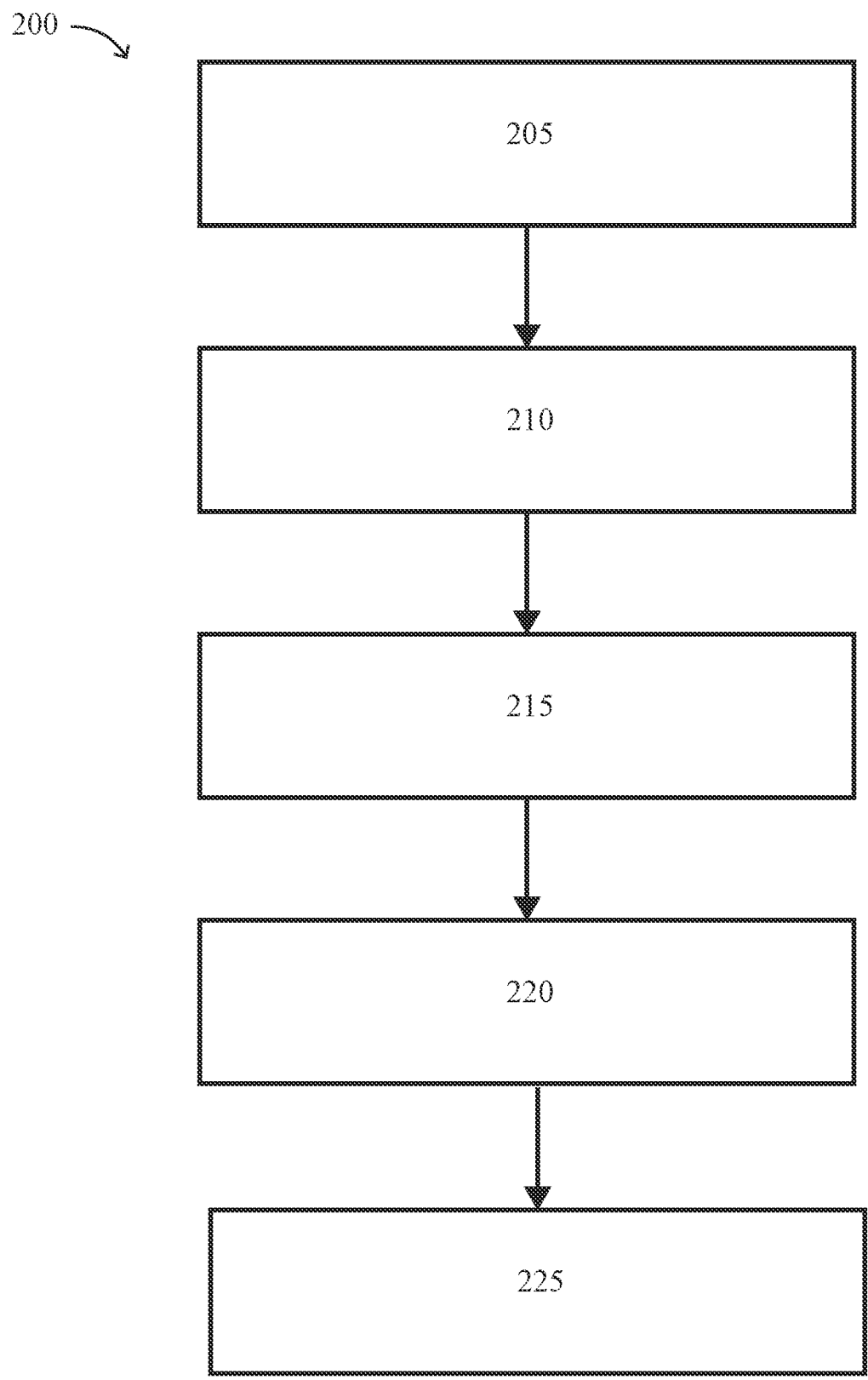
FIG. 2 illustrates a method of manufacturing an inflatable wind turbine blade, according to some aspects of the present disclosure.

FIG. 2 illustrates a method 200 of making an inflatable wind turbine blade 100, according to some aspects of the present disclosure. The method 200 may include manufacturing 205 a pre-fabricated structure 300 (shown in FIG. 5), transporting 210 the pre-fabricated structure 300, and injecting 215 a filler material 125 between the inner fabric layer 115 and the outer fabric layer 120. Some embodiments may also include allowing 220 the filler material 125 to harden.

Figure 5:
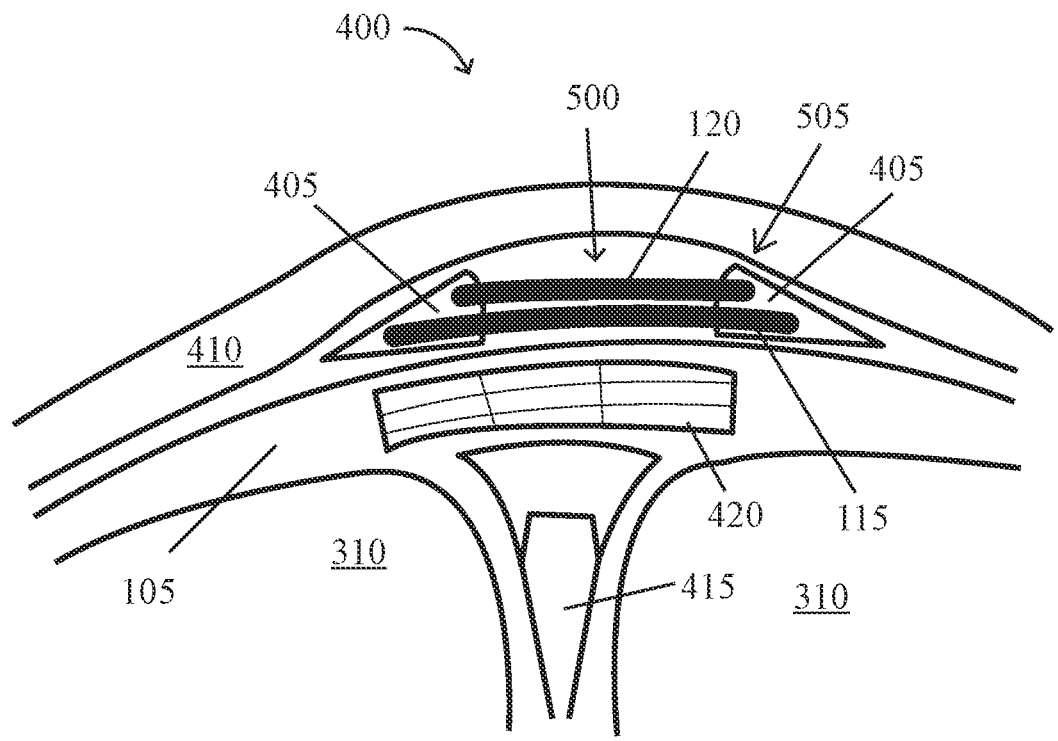
FIG. 5 illustrates how during the manufacturing of an inflatable wind turbine blade portions of the edges may be protected during the curing of the pre-fabricated structure at the spar cap of the primary structure, according to some aspects of the present disclosure.
Figure 6:
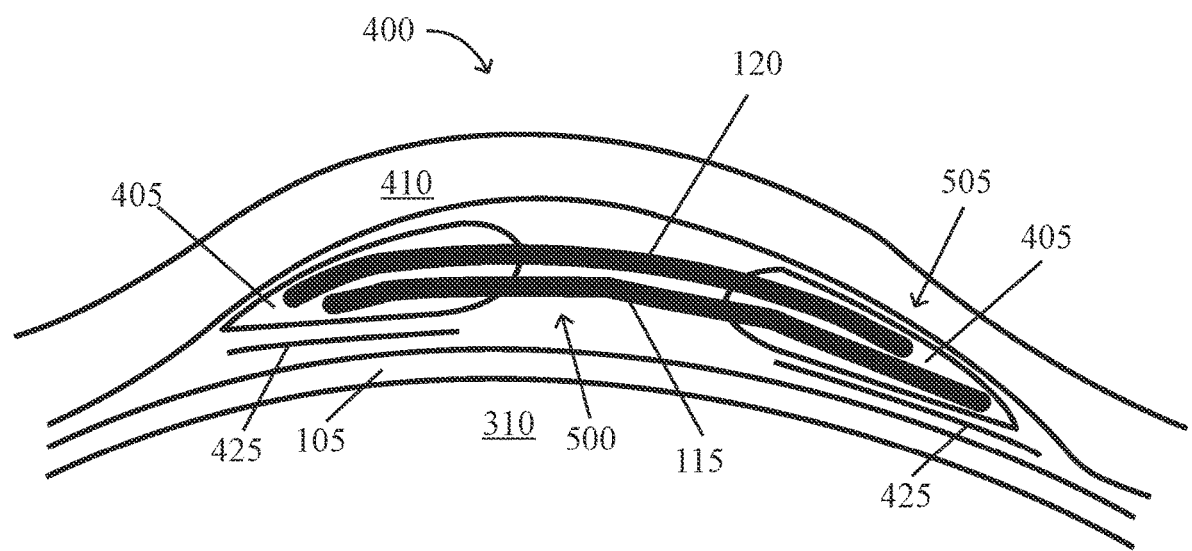
FIG. 6 illustrates how during the manufacturing of an inflatable wind turbine blade portions of the edges may be protected during the curing of the pre-fabricated structure along the side beam of the primary structure, according to some aspects of the present disclosure.

In some embodiments, the method 200 first includes manufacturing 205 a pre-fabricated structure 300 which is made up of a primary structure 105, an inner fabric layer 115, and an outer fabric layer 120 (see FIG. 5 and FIG. 6). The manufacturing 205 may include using traditional wind turbine blade manufacturing processes, such as vacuum assisted resin transfer molding (VARTM), resin transfer molding (RTM), or other similar processes. The manufacturing 205 may also include first shaping the primary structure 105, then positioning the inner fabric layer 115 and the outer fabric layer 120 on the primary structure 105, then protecting the first edge of the inner fabric layer 115 and the second edge of the outer fabric layer 120, and finally applying a resin and curing the pre-fabricated structure 300. The protecting may include using a vacuum-sealed bag to protect at least a portion of the inner fabric layer 115 and/or the outer fabric layer 120 from the resin during the manufacturing 205 (see FIG. 5 and FIG. 6).

The manufacturing 205 may result in an "attachment mechanism" between shell skin 110 and the primary structure 105 being formed, as the layers of fabric are cured to the primary structure 105. This attachment mechanism may transfer loads from the shell skin 110 to the primary structure 105, resulting in a more stable blade 100.

In some embodiments, the method 200 next includes transporting 210 the pre-fabricated structure 300 to the location where the blade 100 will be assembled. This may be approximately the location of the wind turbine where the blade 100 will be installed or the wind farm will the wind turbine where the blade 100 will be installed. It may also be a factory, assembly yard, or other location. The method 200 as described herein allows the blade to be transported 210 prior to being fully assembled, which may reduce transportation costs.

In some embodiments, the method 200 next includes injecting 215 a filler matter 125 between the inner fabric layer 115 and the outer fabric layer 120. The filler material 125 may be a liquid or gas that can be inserted between the layers of fabric (115 and 120) then capable of hardening (i.e., setting or solidifying) at approximately atmospheric conditions at the location where the blade 100 is being assembled.

In some embodiments, the method 200 also includes allowing 220 the filler material 125 to harden (i.e., set or solidify) resulting in the blade 100 having rigid shell skin 110. The final shape of the blade 100 may be based on the filler material 125 in its hardened state. During the allowing 220, a mold or other support structure may be used to maintain the shell skin 110 in the desired final shape. After the filler material 125 has been allowed 220 to harden the mold or other support structure may be removed, as the hardened filler material 125 will maintain its rigidity. Note that this means the overall shape of the blade 100 is not based on the shell skin 110 being held taut, but on the rigidity provided by the solidified filler material 125.

Figure 3:
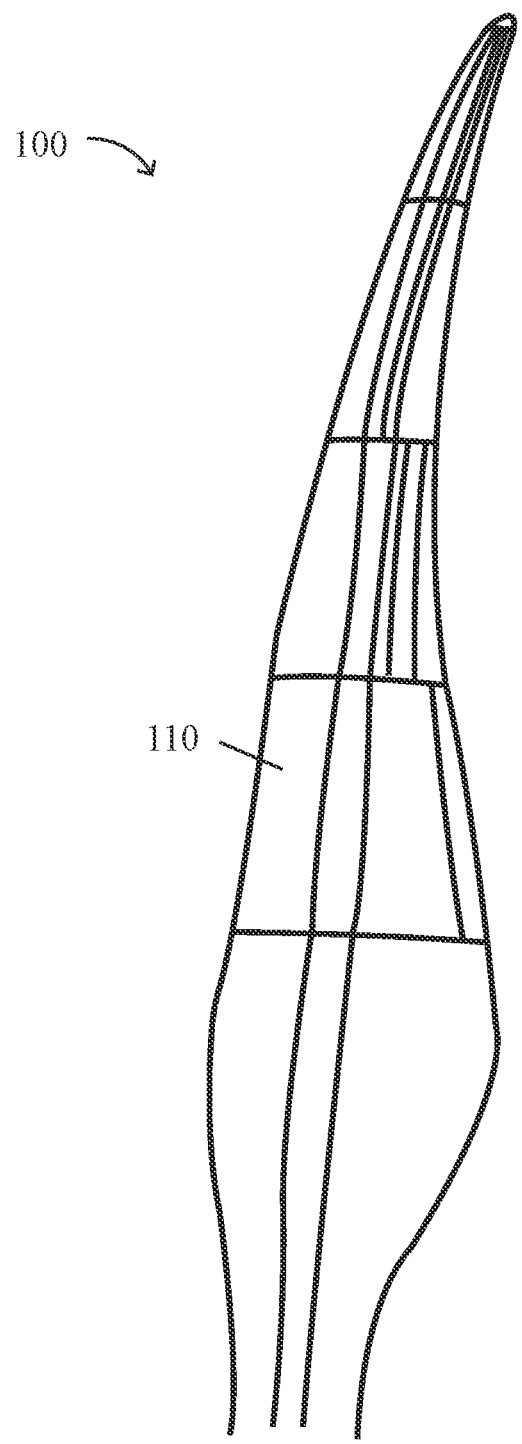
FIG. 3 illustrates chordwise and spanwise compartmentalization of the shell skin of an inflatable wind turbine blade, according to some aspects of the present disclosure.

In some embodiments, the method 200 also includes connecting 225 the inner fabric layer 115 and/or the outer fabric layer 120 to other separate pieces of fabric, or to each other, which may result in the shell skin 110 being made up of a patchwork of connected pieces of fabric, as shown in FIG. 3. The inner fabric layer 115 may be connected to other pieces of fabric in the internal portion of the blade 100. The outer fabric layer 120 may be connected to other pieces of fabric on the external portion of the blade 100. The filler material 125 may be positioned between these two layers of fabric, regardless of how many pieces of fabric make up each layer. Using connected pieces of fabric may again allow for the blade 100 to be transported 210 in pieces, with each piece of fabric capable of being transported 210 separately, if needed. In some embodiments, the connecting 225 may include sewing the ends of the inner fabric layer 115 and the outer fabric layer 120 not connected to the primary structure 105 to each other, essentially sealing the filler material 125 in between them. The connecting 225 allows the blade 100 be more easily transported 210

FIG. 5 illustrates how during the manufacturing of an inflatable wind turbine blade 100 portions of the lengths 505 may be protected during the curing of the pre-fabricated structure 400 at the spar cap 420 of the primary structure 105, according to some aspects of the present disclosure. A VARTM/RTM mold 410 may be used during the manufacturing 205 to hold the components in place during the curing. The inner fabric layer 115 and outer fabric layer 120 may be between the VARTM/RTM mold 410 and the primary structure 105. At least one edge of the inner fabric layer 15 and/or the outer fabric layer 120 may be protected during the manufacturing 205 by a bag 405. The bag 405 may be vacuum-sealed. The pre-fabricated structure in FIG. 5 shows how the inner fabric layer 115 and outer fabric layer 120 may be connected to the primary structure 105 at the approximate location of the shear web (a portion of the primary structure 105) and spar cap 420. To either or both lengths 505 of the inner fabric layer 115 and the outer fabric layer 120 additional pieces of fabric may be connected 225. By exposing the edges 500 of the inner fabric layer 115 and the outer fabric layer 120 to the resin during the manufacturing 205, the load is transferred from the shell skin 110 to the primary structure 105, making the blade 100 more stable.

FIG. 6 illustrates how during the manufacturing of an inflatable wind turbine blade 100 portions of the lengths 505 may be protected during the curing of the pre-fabricated structure 400 along the side beam of the primary structure 105, according to some aspects of the present disclosure. Many of the components shown in FIG. 6 were described with regards to FIG. 5. FIG. 6 shows how adhesive 425 may be used to properly position the bag 405 during the manufacturing 205. The location, position, and size of the bag 405 determines the side of the length 505 of either the inner fabric layer 115 or the outer fabric layer 120 to be protected during the manufacturing 405. This also determines how much length of either the inner fabric layer 115 or the outer fabric layer 120 has resin applied during the manufacturing. The lengths 505 being protected allows them to be connected 225 later to other pieces of fabric, making a larger shell skin than a single piece of fabric (see FIG. 3). The adhesive 425 may be glue, tape, peel ply, or Among other things, the present disclosure relates to an inflatable wind turbine blade 100, which includes a primary structure 105 that may be manufactured separately from the inflatable shell skin 110. The shape of the shell skin 110, when held in shape by the filler material 125, may be guided by blade planform and airfoil parameters. The inflatable wind turbine blade 100 may be manufactured 205 by essentially fusing the fabric layers (i.e., the inner fabric layer 115 and the outer fabric layer 120) of the shell skin 110 to a primary structure 105 during manufacturing 205. As described herein, the inflatable wind turbine blade 100 may avoid current transportation limitations In some embodiments, the present disclosure may allow for wind turbine blade designers to circumvent the traditional maximum chordwise transportation allowable dimension limitation (approximately 4.75 m). This may be done because the inflatable shell skin 110 may be unfilled (i.e., empty) during transportation 210. The inflatable wind turbine blade 100 may be filled/inflated when it arrives on-site (i.e., when it is delivered to the location where it will be used/installed). Using the methods described herein, the traditional maximum chordwise dimension may be the maximum girth of the primary structure. An additional potential benefit of the present disclosure is that an inflatable wind turbine blade 100 may have a significantly reduced weight compared to traditional wind turbine blades.

In some embodiments, the inflatable wind turbine blade 100 may include multiple fabric layers (i.e., an inner fabric layer 115 and an outer fabric layer 120) which are attached to a primary structure 105 prior to curing the entire blade 100. The plurality of fabric layers may be attached to the internal primary structure 105 at points on the top and bottom of the internal primary structure 105 which in some instances may align with the maximum thickness points of the internal primary structure 105.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method of making a blade for a wind turbine rotor, the method comprising:
   manufacturing a pre-fabricated structure comprising a primary structure, an inner fabric layer, and an outer fabric layer;
   transporting the pre-fabricated structure to a wind turbine site; and
   injecting a filler material between the inner fabric layer and the outer fabric layer; wherein:
   the inner fabric layer comprises a first edge and a first length,
   the outer fabric layer comprises a second edge and a second length,
   the manufacturing comprises applying a resin to the primary structure, the first edge, and the second edge, and
   the manufacturing comprises protecting the first length and the second length from the resin.

2. The method of claim 1, wherein:
   the manufacturing comprises using a vacuum assisted resin transfer molding (VARTM) or resin transfer molding (RTM) process.

3. The method of claim 1, wherein:
   the protecting comprises using a vacuum-sealed bag positioned to cover the first length.

4. The method of claim 1, wherein:
   the protecting comprises using a vacuum-sealed bag positioned to cover the second length.

5. The method of claim 1, wherein:
   the resin comprises at least one of a polyester resin, an epoxy resin, or a polyester gelcoat.

6. The method of claim 1, further comprising:
   allowing the filler material to solidify; wherein:
   during the injecting and during the allowing a mold is used to support the inner fabric layer and the outer fabric layer, and
   the mold is removed from the blade when the allowing is completed.

7. The method of claim 6, wherein:
   the mold comprises an inflatable mandrel.

8. The method of claim 1, further comprising:
   connecting the first length to a third length; wherein:
   the inner fabric layer is a first inner fabric layer, and
   a second inner fabric layer comprises the third length.

9. The method of claim 8, wherein:
   the connecting comprises sewing, gluing, or taping.

10. The method of claim 1, further comprising:
    connecting the second length to a fourth length; wherein:
    the outer fabric layer is a first outer fabric layer, and
    a second outer fabric layer comprises the fourth length.

11. The method of claim 10, wherein:
    the connecting comprises sewing, gluing, or taping.

12. The method of claim 1, wherein:
    the filler material comprises polyurethane foam.

13. The method of claim 1, wherein:
    the outer fabric layer has a coating, and the coating comprises a polytetrafluoroethylene-based composition.

* * * * *